April 3, 1956          G. C. DEAR          2,740,499
SELF-ADJUSTING MEANS FOR INTERNAL EXPANDING BRAKES
Filed May 26, 1953
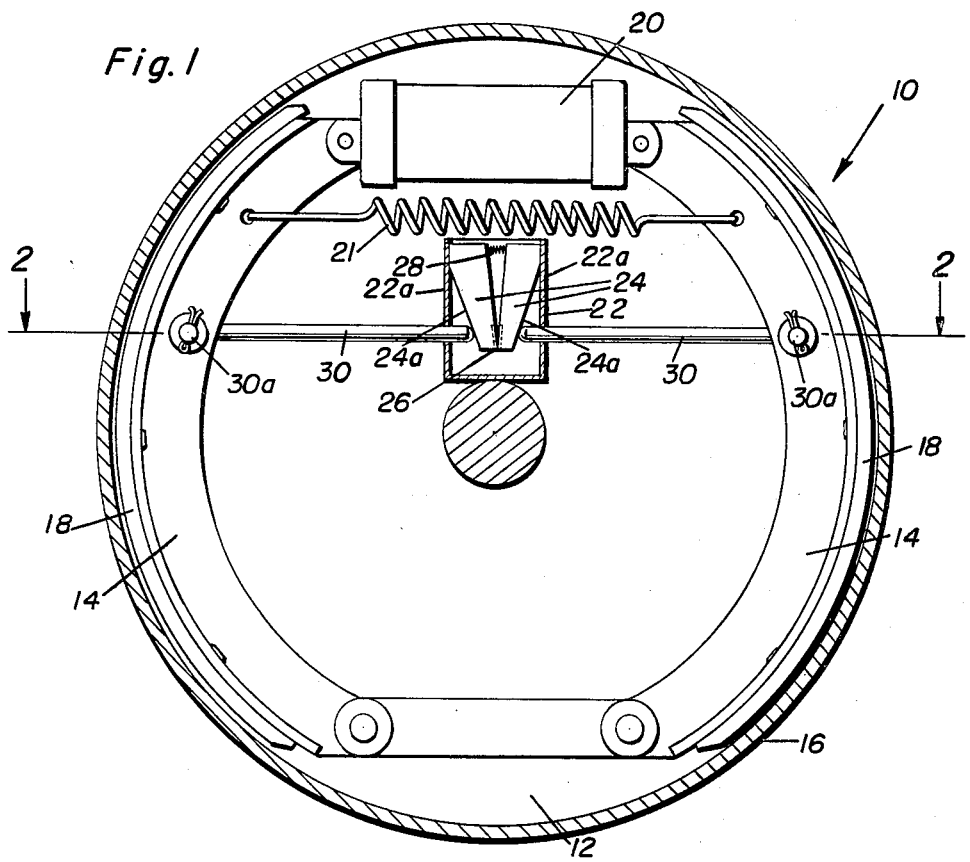
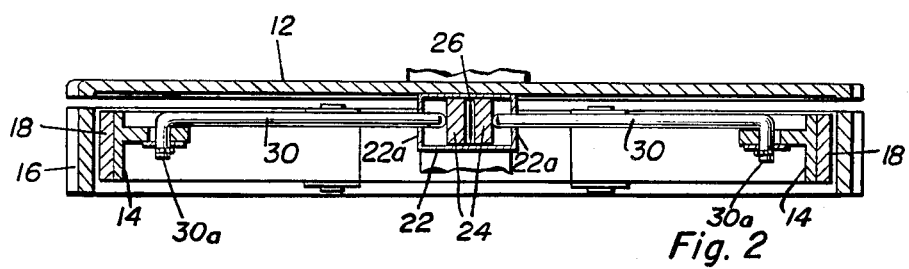
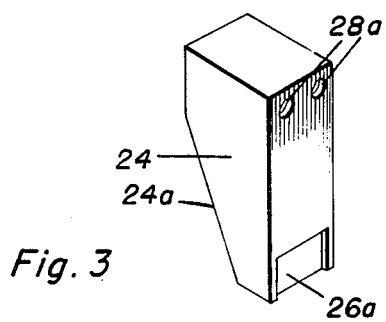
George C. Dear
INVENTOR.

United States Patent Office 2,740,499
Patented Apr. 3, 1956

2,740,499

SELF-ADJUSTING MEANS FOR INTERNAL EXPANDING BRAKES

George C. Dear, Alexandria, La.

Application May 26, 1953, Serial No. 357,471

4 Claims. (Cl. 188—79.5)

This invention relates to new and useful improvements and structural refinements in internal expanding brakes such as are commonly employed on automobiles and similar vehicles, and the principal object of the invention is to eliminate the need for manual adjustment of the brake shoes when the brake lining becomes worn.

The above object is achieved by the provision of self-adjusting means whereby the clearance between the brake shoes and the brake drum is automatically maintained at the correct tolerance regardless of the thickness of the brake lining.

Some of the advantages of the invention reside in its simplicity of construction, in its efficient and dependable operation, and in its adaptability for use in association with internal expanding brakes of various sizes and types.

With the above more important objects and features in view and such other objects and features as may become apparent as this specification proceeds, the invention consists essentially of the arrangement and construction of parts as illustrated in the accompanying drawings, in which:

Figure 1 is a vertical sectional view of the invention installed in an internal expanding brake;

Figure 2 is a horizontal sectional view, taken substantially on the plane of the line 2—2 of Figure 1; and Figure 3 is a perspective view of one of the self-adjusting wedges used in the invention.

Like characters of reference are employed to designate like parts in the specification and throughout the several views.

Referring now to the accompanying drawings in detail, the general reference character 10 designates a conventional internal expanding brake including a brake support 12 carrying a pair of expanding and contracting brake shoes 14 which are engageable, in their expanded positions, with a brake drum 16, the shoes 14 being provided with the customary brake lining 18, and being urged to their expanded position by the usual, hydraulic means 20.

As will be clearly understood, the brake shoes 14 are urged to their inoperative, contracted position by a suitable spring 21 and the essence of novelty in the invention resides in the provision of means for automatically adjusting the brake shoes with respect to the clearance of the brake lining and the brake drum.

These means consist of a box-shaped guide 22 which is secured to the brake support 12 in any suitable manner and includes a pair of side walls 22a, the guide 22 containing a pair of gravity-responsive wedges 24.

The wedges 24 are hingedly connected together at the lower end thereof by a suitable hinge 26 disposed in recesses 26a with which the lower end portions of the wedges are provided, and the upper end portions of the wedges are urged to a spread apart position by a pair of compression springs 28. These springs are seated in suitable, blind bores 28a with which the upper end portions of the wedges are formed.

A pair of rods 30 are pivotally connected to the respective brake shoes 14, as indicated at 30a, and these rods extend slidably through suitable apertures provided in the side walls 22a of the housing 22 so that the inner end extremities thereof operatively engage downwardly convergent outer side surfaces 24a of the wedges 24.

When the device is assembled as shown in Figure 1 and the brake shoes 14 are expanded under the actuation of the hydraulic means 20, the rods 30 are retracted by the brake shoes to some extent in the guide 22, thus permitting the wedges 24 to drop under the influence of gravity. Then, when the brakes are released and the shoes 14 are contracted by the spring 21, the engagement of the rods 30 with the convergent surfaces 24a of the wedges 24 will force the wedges together against the action of the springs 28. Subsequently, when the brake lining 18 is subjected to progressive wear, the wedges 24 will drop farther and farther in the guide 22, thus causing the rods 30 to sustain the brake shoes 14 in a predetermined, spaced relation from the brake drum 16, notwithstanding a decrease in the thickness of the brake lining 18 due to progressive wear. The springs 28 are not sufficiently strong to hold the wedges 24 in friction locking engagement with the side walls 22a of the guide 22, but merely strong enough to spread the wedges 24 apart between the inner ends of the rods 30 to follow up the rods 30 when they separate, as when the brake shoes 14 expand into braking engagement with the brake drum 16. Thus, the wedges 24 always rest upon and are supported by the inner ends of the rods 30. The side walls 22a merely limit spreading apart of the wedges 24 so that as wear on the brake linings 18 occurs and the rods 30 consequently separate further, the wedges 24 may drop in degree corresponding to the degree of further separation of the inner ends of said rods 30. The angle of inclination of the surfaces 24a relative to the line of thrust of the rods 30, under action of the spring 21, is such that the weight of the wedges 24 prevents upward camming of the wedges 24 by thrust of said rods 30 against said surfaces 24a.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a brake including a brake shoe support and a pair of brake shoes mounted on said support for expanding and contracting movement, a pair of aligned rods having inner spaced apart ends slidably mounted on said support and outer ends pivoted to said brake shoes for guided movement of said inner ends toward and from each other by expansion and contraction of said brake shoes, a pair of opposite wedges interposed between said inner ends and having downwardly convergent surfaces resting against and supporting said wedges on said inner ends, said wedges being gravity responsive to drop between said inner ends when the latter move away from each other, means pivotally connecting said wedges together for movement toward each other by movement of said inner ends toward each other and for spreading apart when said inner ends move away from each other, spring means operatively connected to said wedges for spreading the same apart, and means on said support engageable by said wedges and limiting spreading apart of said wedges.

2. The combination of claim 1, said last named means comprising a pair of spaced walls on said support between which said wedges are interposed.

3. The combination of claim 2, said walls slidingly supporting said inner ends of said rods.

4. The combination of claim 1, said spring means comprising an expansion spring interposed between said wedges and carried thereby.

References Cited in the file of this patent
UNITED STATES PATENTS 2,210,336 Payne Aug. 6, 1940